(12) United States Patent
Iitaka et al.

(10) Patent No.: US 8,544,354 B2
(45) Date of Patent: Oct. 1, 2013

(54) CONTROLLER FOR VEHICLE AUTOMATIC TRANSMISSION

(75) Inventors: Ryo Iitaka, Wako (JP); Shiro Godai, Wako (JP); Kohsaku Matsuo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 883 days.

(21) Appl. No.: 12/365,334

(22) Filed: Feb. 4, 2009

(65) Prior Publication Data
US 2009/0197737 A1    Aug. 6, 2009

(30) Foreign Application Priority Data
Feb. 6, 2008    (JP) ................................. 2008-026209

(51) Int. Cl.
*F16H 61/00*    (2006.01)

(52) U.S. Cl.
USPC ............................................................ 74/335

(58) Field of Classification Search
USPC .................... 74/325, 329, 330, 331, 333, 334, 74/335, 730.1, 731.1, 732.1; 477/180, 129, 477/132, 135, 140; 192/85.63, 85.25
See application file for complete search history.

(56) References Cited

U.S. PATENT DOCUMENTS

| | | | | |
|---|---|---|---|---|
| 4,838,125 A | | 6/1989 | Hamano et al. | |
| 4,916,961 A | * | 4/1990 | Holbrook et al. | ............ 74/337.5 |
| 5,024,125 A | * | 6/1991 | Baba | ................................ 477/98 |
| 5,097,725 A | * | 3/1992 | Sawa | .............................. 477/129 |
| 5,474,506 A | * | 12/1995 | Palansky et al. | ................. 477/63 |
| 5,679,097 A | * | 10/1997 | Ohtsuka | ......................... 477/121 |
| 6,390,949 B1 | * | 5/2002 | Kondo et al. | .................. 477/143 |
| 6,669,593 B2 | * | 12/2003 | Takatori et al. | ............... 475/120 |
| 6,684,114 B1 | * | 1/2004 | Erickson et al. | ................. 700/45 |
| 6,684,144 B2 | * | 1/2004 | Sekii et al. | ........................ 701/51 |
| 6,692,408 B2 | * | 2/2004 | Sato et al. | ...................... 477/129 |
| 7,121,162 B2 | * | 10/2006 | Hatakeyama et al. | .......... 74/360 |
| 7,160,227 B2 | * | 1/2007 | Kuwahara et al. | ............. 477/116 |
| 7,354,378 B2 | * | 4/2008 | Ochi et al. | ..................... 477/115 |
| 7,437,965 B2 | * | 10/2008 | Shizume | ........................... 74/333 |
| 2001/0032044 A1 | | 10/2001 | Hanawa et al. | |
| 2003/0186780 A1 | * | 10/2003 | Estebanez et al. | ............. 477/107 |
| 2005/0126321 A1 | * | 6/2005 | Ochi et al. | ........................ 74/335 |
| 2008/0146412 A1 | * | 6/2008 | Sagawa et al. | ................. 477/108 |

FOREIGN PATENT DOCUMENTS

| | | |
|---|---|---|
| EP | 1 528 293 A2 | 5/2005 |
| JP | 08-028591 A | 2/1996 |

* cited by examiner

*Primary Examiner* — Ha D Ho
*Assistant Examiner* — Jude Agendia
(74) *Attorney, Agent, or Firm* — Arent Fox LLP (57) ABSTRACT

Monitoring means 46, 47 are provided to monitor working hydraulic pressure of the hydraulic engagement elements for the high gear range of a vehicle automatic transmission 2. Characteristic changing means 5 is provided to change, to a high vehicle speed side, a gear shifting characteristic when shifting from the middle gear position to the low gear position. According thereto, it is possible to quickly shift from a middle gear position to a low gear position without reducing the durability of hydraulic engagement elements for a high gear range, thereby, to achieve sufficient acceleration performance during climbing a slope, which improves driveability.

6 Claims, 8 Drawing Sheets

CONTROLLER FOR VEHICLE AUTOMATIC TRANSMISSION

BACKGROUND OF THE INVENTION

1. Field of the Invention

The present invention relates to a controller for a vehicle automatic transmission, which engages or disengages, in a rotational state, plural hydraulic engagement elements operated by a hydraulic pressure to switch plural gear positions, defined based on the traveling conditions of the vehicle, automatically according to predetermined gear shifting characteristics.

2. Description of the Related Art

This kind of controller controls the feed and discharge of working oil to and from hydraulic clutches as plural hydraulic engagement elements provided in a transmission to store, in an electronic control circuit, gear shifting characteristics obtained by setting, for example, throttle openings of an engine (or accelerator pedal openings) and vehicle speeds as parameters. Then, the controller engages or disengages the hydraulic clutches to perform automatic gear shifting in order to effect gear positions according to the gear shifting characteristics.

This kind of hydraulic clutch includes a hydraulic chamber to which working oil is supplied, and a piston for bring plural friction plates into pressure contact with each other by a hydraulic pressure of the hydraulic chamber. The hydraulic chamber and the piston are provided on a rotating shaft to rotate integrally with the rotating shaft. The feed and discharge of working oil to and from the hydraulic chamber is done through an oil passage provided on the rotating shaft. When the working oil is supplied to the hydraulic chamber, the piston presses the plural friction plates to frictionally engage the friction plates. On the other hand, when the working oil is discharged from the hydraulic chamber, the pressing force of the piston is released to make the plural friction plates enter a disengaged state. However, upon shifting from the engaged state to the disengaged state while they are rotating, the working oil may not be discharged smoothly from the hydraulic chamber due to its centrifugal force. In this case, the pressing force of the piston is not released due to centrifugal hydraulic pressure in the hydraulic chamber. As a result, the friction plates become a half-engaged state (so-called dragged state), and this may reduce the durability of the hydraulic clutches due to heat developed in the friction plates, and the like.

To solve this problem, there is known a conventional structure, which provides, in each hydraulic clutch, a centrifugal pressure canceller chamber opposite to the hydraulic chamber to supply working oil to the centrifugal pressure canceller chamber at the time of discharging the working oil from the hydraulic chamber in order to cancel the centrifugal hydraulic pressure generated in the hydraulic chamber (for example, see Japanese Patent Application Publication No. 8-28591).

However, if the centrifugal pressure canceller chamber is provided for all the hydraulic clutches included in the transmission, not only the structure of the transmission becomes complicated, but also the transmission cannot be made compact. Therefore, in general, the centrifugal pressure canceller chamber is provided only for a low gear range of hydraulic clutches, not provided for a high gear range of hydraulic clutches, to prevent the transmission from becoming a large size. Further, if normal gear shifting characteristics are used in this structure, since a shift to a low gear position is performed while keeping a high-speed state of the vehicle upon shifting a middle gear position to the low gear position, hydraulic clutches for a high gear range rotates at high speed to cause a dragged state. To avoid this, the hydraulic pressure of the hydraulic clutches needs to be so released that the hydraulic clutches for the high gear range do not rotate at high speed. In other words, a gear shifting characteristic from the middle gear position to the low gear position is set to a low vehicle speed side to shift to the low gear position after the vehicle speed is sufficiently slowed down at the middle gear position. Then, after shifting to the low gear position, the rotation of the hydraulic clutches for the high gear range is suppressed to release the hydraulic pressure of the hydraulic clutches.

However, such a setting of gear shifting characteristics as to give priority to protection of the hydraulic clutches result in holding the middle gear position for a relatively long time until the vehicle speed is sufficiently slowed down after shifting from a high gear position to the middle gear position during climbing a slope. In this case, sufficient acceleration cannot be obtained due to a delay of downshift. Further, even during sports run on a winding road without entering the high gear range at all, since the gear shifting characteristics are set to the low vehicle speed side, sufficient acceleration cannot be obtained due to a delay of downshift, causing a problem of making driveability worse.

SUMMARY OF THE INVENTION

It is an object of the present invention to solve such a problem and provide a controller for a vehicle automatic transmission, which enables a quick shift from a middle gear position to a low gear position without reducing the durability of hydraulic engagement elements for a high gear range, and which achieves sufficient acceleration performance during climbing a slope or the like to improve driveability.

In order to attain the above object, in a first aspect of the present invention, there is provided a controller for a vehicle automatic transmission, which engages or disengages plural hydraulic engagement elements in a rotational state to switch plural gear positions, defined based on traveling conditions of the vehicle, automatically according to predetermined gear shifting characteristics, the controller comprising: monitoring means which monitors working hydraulic pressure of hydraulic engagement elements for a high gear range to effect a high gear position among the gear positions; and characteristic changing means which changes, to a high vehicle speed side, a gear shifting characteristic for shifting from a middle gear position to a low gear position among the gear shifting characteristics in the case where the hydraulic engagement elements for the high gear range are disengaged along with a shift from a high gear position to the middle gear position and in the case when the working hydraulic pressure monitored by the monitoring means has become zero or equal or less than positive threshold.

According to the first aspect of the present invention, upon the downshift from the high gear position to the middle gear position, the gear shifting characteristic for shifting from the middle gear position to the low gear position is changed to the high vehicle speed side. This results in the downshift from the middle gear position to the low gear position before the vehicle speed is not reduced so much, so that sufficient acceleration performance during climbing a slope or the like can be obtained, thereby improving driveability. The change in this gear shifting characteristic is made when the hydraulic engagement elements for the high gear range are disengaged along with a shift from the high gear position to the middle gear position and when the working hydraulic pressure monitored by the monitoring means has become zero or equal or less than positive threshold. This makes it possible to prevent the hydraulic engagement elements for the high gear range from rotating at high speed in a half-engaged state, and hence prevent reduction of the durability of the hydraulic engagement elements for the high gear range.

In a second aspect of the present invention, there is provided a controller for a vehicle automatic transmission, which engages or disengages plural hydraulic engagement elements in a rotational state to switch plural gear positions, defined based on traveling conditions of the vehicle, automatically according to predetermined gear shifting characteristics, the controller comprising: monitoring means which monitors working hydraulic pressure of hydraulic engagement elements for a high gear range to effect a high gear position among the gear positions; and characteristic changing means which changes, to a high vehicle speed side, a gear shifting characteristic for shifting from a middle gear position to a low gear position among the gear shifting characteristics in the case where the hydraulic engagement elements for the high gear range are disengaged along with a shift from a high gear position to the middle gear position, and in the case when a predetermined period of time has elapsed after the working hydraulic pressure monitored by the monitoring means became zero or equal or less than positive threshold.

The second aspect of the present invention differs from the first aspect of the present invention only in that the gear shifting characteristic is changed to the high vehicle speed side when the predetermined period of time has elapsed after the monitoring means monitored that the working hydraulic pressure became zero or equal or less than positive threshold. This makes it possible to ensure prevention of working hydraulic pressure remaining in the hydraulic engagement elements for the high gear range, and hence reduction of the durability of the hydraulic engagement elements for the high gear range.

In the first or second aspect of the present invention, hydraulic pressure detectors for detecting the working hydraulic pressure of the hydraulic engagement elements for the high gear range may be employed as the monitoring means. Alternatively, an estimate value of the working hydraulic pressure may be determined based on the rotational speed of an input shaft of the hydraulic engagement elements for the high gear range and the working oil temperature of the hydraulic engagement elements for the high gear range to perform monitoring based on the estimate value. The hydraulic pressure detectors may be hydraulic pressure switches or hydraulic pressure sensors.

DESCRIPTION OF THE PREFERRED EMBODIMENTS

Figure 1:
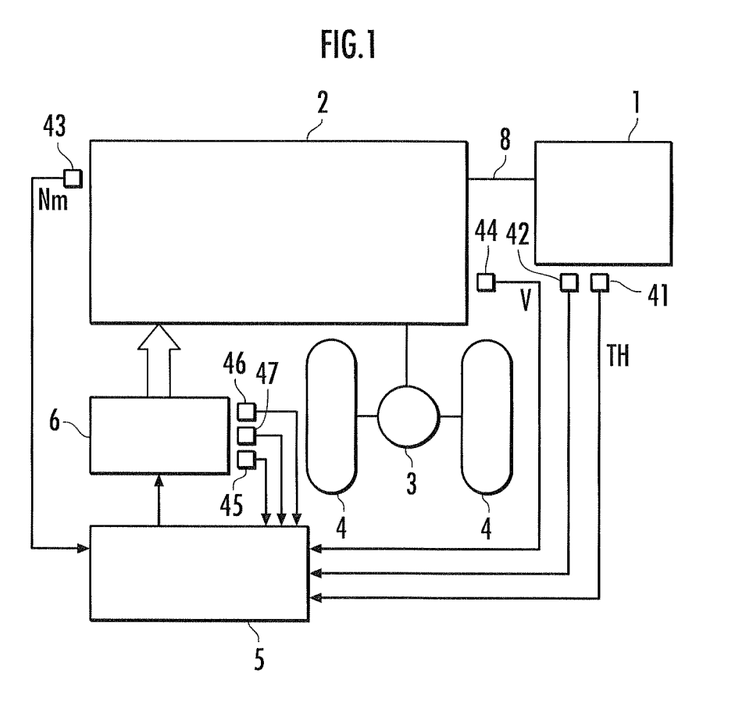
FIG. 1 is a block diagram showing a control system of an automatic transmission for a vehicle in an embodiment of the present invention.

A preferred embodiment of the present invention will now be described with reference to the accompanying drawings. In FIG. 1, numeral 1 designates an engine, and a vehicle automatic transmission 2 with 5-step forward and 1-step reverse design is coupled to the output side of the engine 1. Drive wheels 4 of a vehicle are coupled to the output side of the transmission 2 through a differential mechanism 3. Numeral 5 designates an electronic control circuit consisting of a microcomputer and the like, and numeral 6 designates a hydraulic pressure control circuit having electromagnetic valves. The hydraulic control circuit 6 is controlled by the electronic control circuit 5 to control the feed and discharge of oil to and from hydraulic clutches as hydraulic engagement elements provided in the transmission 2 and to be described later in order to perform gear shifting. The electronic control circuit 5 also has a function as characteristic changing means according to the present invention to be described later.

Figure 3:
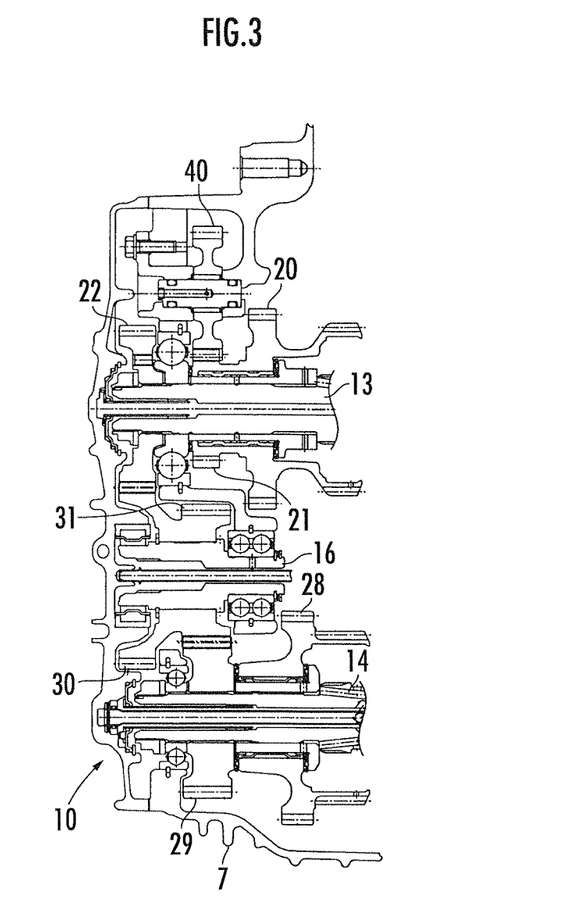
FIG. 3 is a descriptive sectional view of the other section of the automatic transmission for a vehicle.
Figure 4:
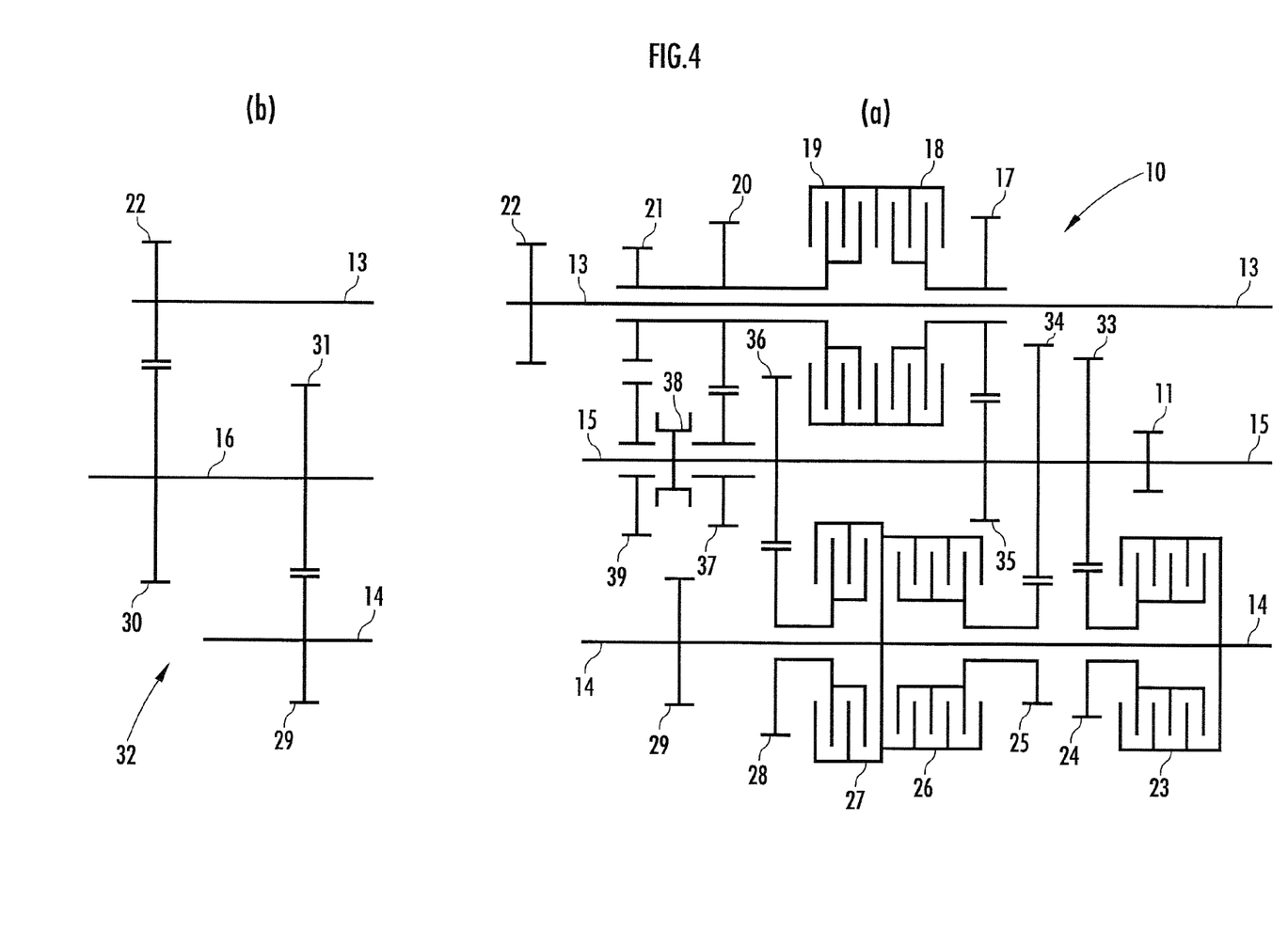
FIG. 4 is a skeleton diagram showing a power transmission system of the automatic transmission for a vehicle.

The structure of the transmission 2 will first be described with reference to FIG. 2 to FIG. 4. The transmission 2 includes, in a transmission housing 7, a torque converter 9 connected to an engine output shaft 8 (see FIG. 1) and a parallel shaft type transmission mechanism 10 connected to an output member (turbine) of the torque converter 9. A driving force is transmitted to the drive wheels 4 (see FIG. 1) of the vehicle from the differential mechanism 3 having a final reduction driven gear 12 meshed with a final reduction drive gear 11 of the parallel shaft type transmission mechanism 10. The parallel shaft type transmission mechanism 10 has a first input shaft 13, a second input shaft 14, a countershaft 15, and an idle shaft 16, all of which extend in parallel with one another. FIG. 4(a) and FIG. 4(b) show a power transmission structure corresponding to FIG. 2 and FIG. 3, respectively.

The first input shaft 13 is coupled to the turbine of the torque converter 9, and rotated integrally with the turbine in response to a driving force from the turbine. A 5-speed drive gear 17, a 5-speed hydraulic clutch 18, a 4-speed hydraulic clutch 19, a 4-speed drive gear 20, a reverse drive gear 21, and a first joint gear 22 are provided on the first input shaft 13 in order from the torque converter 9 side, i.e., from the right side in FIG. 4(a). The 5-speed drive gear 17 is provided rotatably on the first input shaft 13, and engaged with or disengaged from the first input shaft 13 by means of the 5-speed hydraulic clutch 18 operated by a hydraulic pressure. The 4-speed drive gear 20 and the reverse drive gear 21 are provided rotatably on the first input shaft 13 in such a manner that they are integrally coupled, and engaged with or disengaged from the first input shaft 13 by means of the 4-speed hydraulic clutch 19 operated by the hydraulic pressure. The first joint gear 22 is coupled to the first input shaft 13.

The second input shaft 14 is provided rotatably in parallel with the first input shaft 13. A 2-speed hydraulic clutch 23, a 2-speed drive gear 24, a LOW drive gear 25, a LOW hydraulic clutch 26, a 3-speed hydraulic clutch 27, a 3-speed drive gear 28, and a fourth joint gear 29 are provided on the second input shaft 14 in order from the torque converter 9 side, i.e., from the right side in FIG. 4(a). The 2-speed drive gear 24, the LOW drive gear 25, and the 3-speed drive gear 28 are provided rotatably on the second input shaft 14, respectively, and engaged with or disengaged from the second input shaft 14 by means of the 2-speed hydraulic clutch 23, the LOW hydraulic clutch 26, and the 3-speed hydraulic clutch 27, all of which are operated by the hydraulic pressure. The fourth joint gear 29 is coupled to the second input shaft 14. The LOW hydraulic clutch 26, the 2-speed hydraulic clutch 23, the 3-speed hydraulic clutch 27, the 4-speed hydraulic clutch 19, and the 5-speed hydraulic clutch 18 are hydraulic engagement elements according to the present invention, and the 4-speed hydraulic clutch 19 and the 5-speed hydraulic clutch 18 serve as hydraulic engagement elements for a high gear range according to the present invention.

Figure 2:
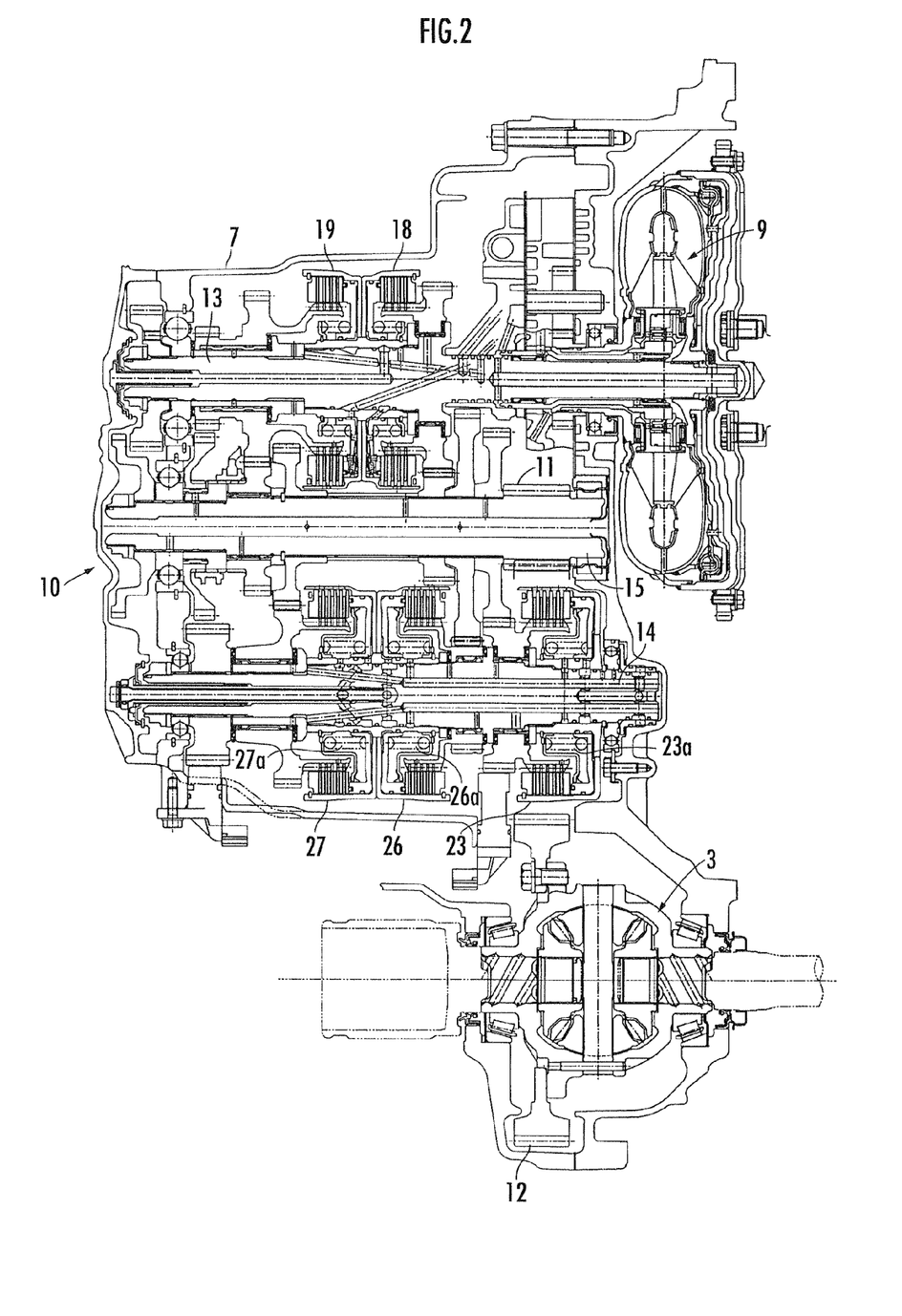
FIG. 2 is a descriptive sectional view of an essential section of the automatic transmission for a vehicle.

The idle shaft 16 is located on the back of the countershaft 15 in FIG. 2, and provided rotatably in parallel with the countershaft 15. A second joint gear 30 and a third joint gear 31 are provided integrally with the idle shaft 16. The second joint gear 30 is meshed with the first joint gear 22, and the third joint gear 31 is meshed with the fourth joint gear 29. The first to fourth joint gears 22, 30, 31, and 29 form a joint gear train 32 so that the rotation of the first input shaft 13 is always transmitted to the second input shaft 14 through the joint gear train 32.

The countershaft 15 is provided rotatably, and on this shaft, a final reduction drive gear 11, a 2-speed driven gear 33, a LOW driven gear 34, a 5-speed driven gear 35, a 3-speed driven gear 36, a 4-speed driven gear 37, a dog-tooth clutch 38, and a reverse driven gear 39 are provided in order from the right side in FIG. 4(a). The final reduction drive gear 11, the 2-speed driven gear 33, the LOW driven gear 34, the 5-speed driven gear 35, and the 3-speed driven gear 36 are coupled to the countershaft 15, and rotated integrally therewith. The 4-speed driven gear 37 is provided rotatably on the countershaft 15. The reverse driven gear 39 is also provided rotatably on the countershaft 15. The dog-tooth clutch 38 is operated in the axial direction to engage or disengage the 4-speed driven gear 37 with or from the countershaft 15, and to engage or disengage the reverse driven gear 39 with or from the countershaft 15. As shown, the LOW drive gear 25 is meshed with the LOW driven gear 34, the 2-speed drive gear 24 is meshed with the 2-speed driven gear 33, the 3-speed drive gear 28 is meshed with the 3-speed driven gear 36, the 4-speed drive gear 20 is meshed with the 4-speed driven gear 37, and the 5-speed drive gear 17 is meshed with the 5-speed driven gear 35, respectively. Further, the reverse drive gear 21 is meshed with the reverse driven gear 39 through a reverse idler gear 40 (see FIG. 3).

Though not shown, the final reduction drive gear 11 is meshed with the final reduction driven gear 12 (see FIG. 2), and the rotation of the countershaft 15 is transmitted to the differential mechanism 3 through the final reduction drive gear 11 and the final reduction driven gear 12.

The following describes the setting of each gear position and its drivetrain in the transmission having the above-mentioned structure. In this transmission 2, the dog-tooth clutch 38 moves to the right in the forward range in FIG. 4 to couple the 4-speed driven gear 37 to the countershaft 15. In the reverse range, the dog-tooth clutch 38 moves to the left to couple the reverse driven gear 39 to the countershaft 15.

The following describes five gear positions (LOW speed, second speed, third speed, fourth speed, and fifth speed) in the forward range. The LOW speed is set by engaging the LOW hydraulic clutch 26. The rotational driving force transmitted from the torque converter 9 to the first input shaft 13 is transmitted to the second input shaft 14 through the joint gear train 32. Here, when the LOW hydraulic clutch 26 is engaged, the LOW drive gear 25 is driven to rotate integrally with the second input shaft 14, and the LOW driven gear 34 meshed with the LOW drive gear 25 is driven to rotate, driving the countershaft 15. This driving force is transmitted to the differential mechanism 3 through the final reduction drive gear 11 and the final reduction driven gear 12.

The second speed is set by engaging the 2-speed hydraulic clutch 23. The rotational driving force transmitted from the torque converter 9 to the first input shaft 13 is transmitted to the second input shaft 14 through the joint gear train 32. Here, when the 2-speed hydraulic clutch 23 is engaged, the 2-speed drive gear 24 is driven to rotate integrally with the second input shaft 14, and the 2-speed driven gear 33 meshed with the 2-speed drive gear 24 is driven to rotate, driving the countershaft 15. This driving force is transmitted to the differential mechanism 3 through the final reduction drive gear 11 and the final reduction driven gear 12.

The third speed is set by engaging the 3-speed hydraulic clutch 27. The rotational driving force transmitted from the torque converter 9 to the first input shaft 13 is transmitted to the second input shaft 14 through the joint gear train 32. Here, when the 3-speed hydraulic clutch 27 is engaged, the 3-speed drive gear 28 is driven to rotate integrally with the second input shaft 14, and the 3-speed driven gear 36 meshed with the 3-speed drive gear 28 is driven to rotate, driving the countershaft 15. This driving force is transmitted to the differential mechanism 3 through the final reduction drive gear 11 and the final reduction driven gear 12.

The fourth speed is set by engaging the 4-speed hydraulic clutch 19. The rotational driving force transmitted from the torque converter 9 to the first input shaft 13 results in driving the 4-speed drive gear 20 to rotate as a result of engaging the 4-speed hydraulic clutch 19, and hence driving the 4-speed driven gear 37 meshed therewith to rotate. Here, since the 4-speed driven gear 37 is engaged with the countershaft 15 by means of the dog-tooth clutch 38 in the forward range, the countershaft 15 is driven and this driving force is transmitted to the differential mechanism 3 through the final reduction drive gear 11 and the final reduction driven gear 12.

The fifth speed is set by engaging the 5-speed hydraulic clutch 18. The rotational driving force transmitted from the torque converter 9 to the first input shaft 13 drives the 5-speed drive gear 17 to rotate through the 5-speed hydraulic clutch 18, and hence drives the 5-speed driven gear 35 meshed therewith to rotate. Since the 5-speed driven gear 35 is coupled to the countershaft 15, the countershaft 15 is driven and this driving force is transmitted to the differential mechanism 3 through the final reduction drive gear 11 and the final reduction driven gear 12.

In the reverse range, the 4-speed hydraulic clutch 19 is also used as a reverse clutch. In other words, the reverse range is set by engaging the 4-speed hydraulic clutch 19 and making the dog-tooth clutch 38 move to the left. The rotational driving force transmitted from the torque converter 9 to the first input shaft 13 drives the reverse drive gear 21 to rotate through the 4-speed hydraulic clutch 19, and hence drives the reverse driven gear 39 meshed therewith to rotate through the reverse idler gear 40. Since the reverse driven gear 39 is engaged with the countershaft 15 by means of the dog-tooth clutch 38, the countershaft 15 is driven and this driving force is transmitted to the differential mechanism 3 through the final reduction drive gear 11 and the final reduction driven gear 12.

Figure 5:
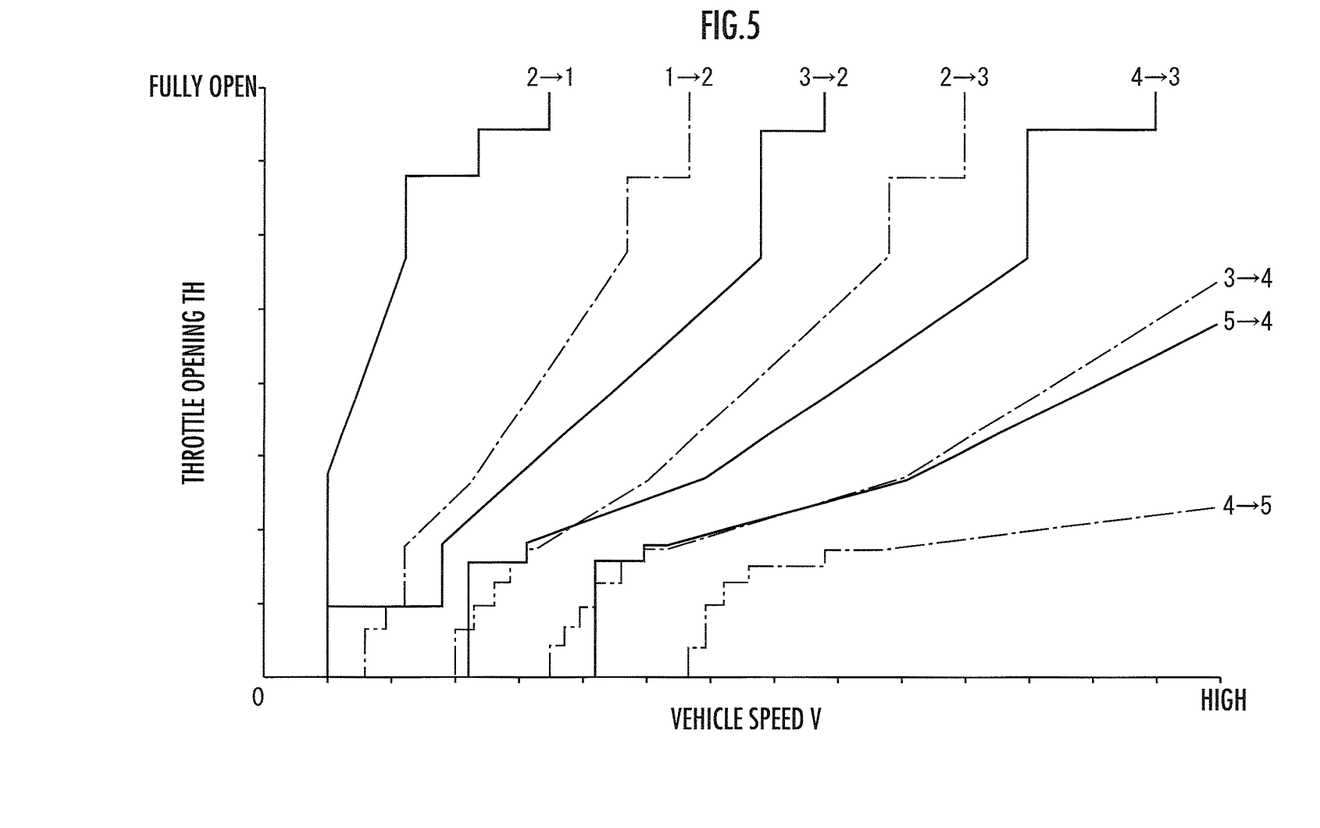
FIG. 5 is a line chart showing gear shifting characteristics.

The hydraulic clutches 26, 23, 27, 19, and 18 for the respective gear positions are controlled by the electronic control circuit 5 through the hydraulic control circuit 6 shown in FIG. 1. Though not shown, the hydraulic control circuit 6 includes a hydraulic pressure source, plural electromagnetic valves, etc. to supply working oil to each of the hydraulic clutches 26, 23, 27, 19, and 18 selectively by switching the electromagnetic valves. As shown in FIG. 1, the electronic control circuit 5 receives input signals from a sensor 41 for detecting throttle openings (TH) of the engine 1 or accelerator pedal openings (AP), a sensor 42 for detecting the engine speed, a sensor 43 for detecting the input shaft speed (Nm) of the transmission 2, a sensor 44 for detecting the vehicle speed (V) from the output shaft speed of the transmission 2, a sensor 45 for detecting the working oil temperature of the clutches, etc., and performs automatic gear shifting in a range from the first speed to the fifth speed according to gear shifting characteristics as shown in FIG. 5 (where the solid lines indicate downshift characteristics and the alternate long and short dash lines indicate upshift characteristics) obtained by setting, as parameters, the throttle openings (TH) or accelerator pedal openings (AP) and the vehicle speeds (V) prestored in the electronic control circuit 5. Further, in FIG. 1, the electronic control circuit 5 receives, as will be described later, input signals from a 4-speed hydraulic pressure switch (hydraulic pressure detector) 46 for detecting the working hydraulic pressure (or the remaining amount of hydraulic oil) in the 4-speed hydraulic clutch 19 and a 5-speed hydraulic pressure switch 47 (hydraulic pressure detector) for detecting the working hydraulic pressure (or the remaining amount of hydraulic oil) in the 5-speed hydraulic clutch 18 to change a gear shifting characteristic for a downshift from the third speed to the middle gear position (corresponding to the present invention) to the second speed (corresponding to the low gear position in the present invention) based on predetermined conditions. The 4-speed hydraulic pressure switch 46 and the 5-speed hydraulic pressure switch 47 form monitoring means according to the present invention. The hydraulic pressure detectors for detecting the working hydraulic pressure (or the remaining amount of hydraulic oil) in the 4-speed hydraulic clutch 19 and the 5-speed hydraulic clutch 18 are not limited to the hydraulic pressure switches, and they may be hydraulic pressure sensors, for example.

Returning to FIG. 2, the LOW hydraulic clutch 26, the 2-speed hydraulic clutch 23, and the 3-speed hydraulic clutch 27 include centrifugal pressure canceller chambers 26a, 23a, and 27a, respectively. The centrifugal pressure canceller chambers 26a, 23a, and 27a cancel the centrifugal force generated in the working oil inside each of the clutches 26, 23, and 27 upon disengaging the clutch so that the working oil can be discharged smoothly. On the other hand, no centrifugal pressure canceller chamber is provided in the 4-speed hydraulic clutch 19 and the 5-speed hydraulic clutch 18. This makes the structure around the first input shaft 13 simple without increasing the sizes of the 4-speed hydraulic clutch 19 and the 5-speed hydraulic clutch 18, resulting in a compact structure. However, upon downshifting from the third speed to the second speed, if the vehicle speed (V) is not slowed down enough to slow down the rotational speed of the 4-speed hydraulic clutch 19 and/or the 5-speed hydraulic clutch 18, the influence of centrifugal force cannot be eliminated. Therefore, as indicated by the solid line in FIG. 5, the gear shifting characteristic related to the downshift from the third speed to the second speed is usually set to a relatively low vehicle speed side.

In other words, a gear shifting characteristic from a middle gear position to a low gear position is set to a low vehicle speed side to shift to the low gear position after the vehicle speed is slowed down sufficiently at the middle gear position in order to release the hydraulic pressure from the 4-speed hydraulic clutch 19 and the 5-speed hydraulic clutch 18 while suppressing the rotation of the 4-speed hydraulic clutch 19 and the 5-speed hydraulic clutch 18. However, such a setting of gear shifting characteristics as to give priority to protection of the 4-speed hydraulic clutch 19 and the 5-speed hydraulic clutch 18 just results in holding the middle gear position for a relatively long time until the vehicle speed is sufficiently slowed down after shifting from the high gear position to the middle gear position during climbing a slope, so that sufficient acceleration cannot be obtained due to a delay of downshift. Further, even during sports run on a winding road without entering the high gear range at all, since the gear shifting characteristics are set to the low vehicle speed side, sufficient acceleration cannot also be obtained due to a delay of downshift, making driveability worse.

Figure 6:
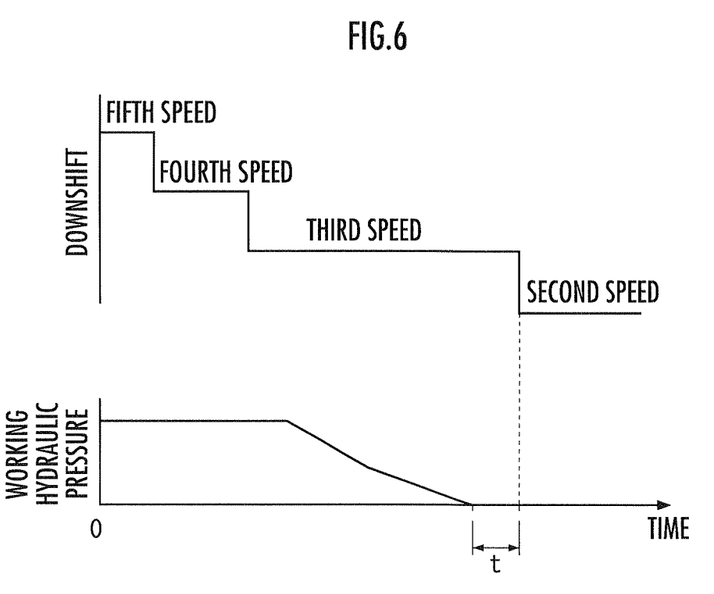
FIG. 6 is a line chart showing a relationship between downshift and working hydraulic pressure in the embodiment of the present invention.
Figure 7:
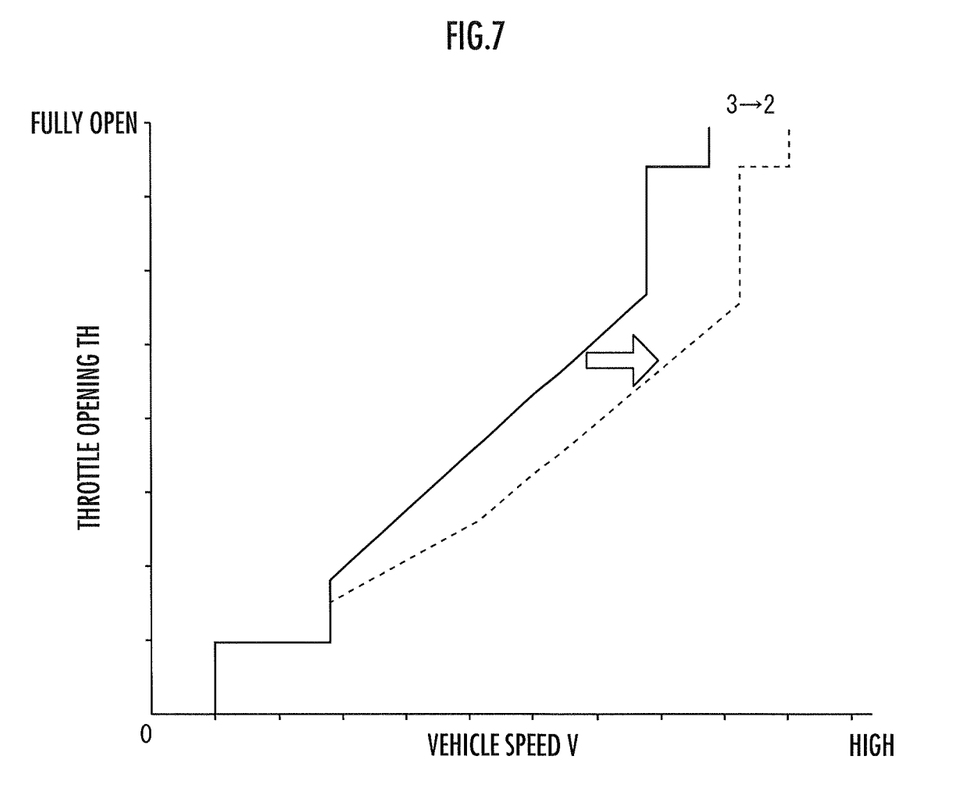
FIG. 7 is a line chart showing a change in gear shifting characteristics.

Therefore, as shown in FIG. 6, the electronic control circuit 5 of the embodiment is configured to confirm that the working hydraulic pressure in the 5-speed hydraulic clutch 18 and the working hydraulic pressure in the 4-speed hydraulic clutch 19 have become zero (i.e., that discharge of the hydraulic oil is completed) from information acquired from the 5-speed hydraulic pressure switch 47 and the 4-speed hydraulic pressure switch 46 after the downshift from the fourth speed to the third speed. Further, when a predetermined period of time t has elapsed after that, the electronic control circuit 5 enables a downshift from the third speed to the second speed. At this time, as shown in FIG. 7, a characteristic line for the downshift from the third speed to the second speed as indicated by the solid line is changed to a high vehicle speed side as indicated by the dotted line to perform the downshift according to the changed gear shifting characteristic. This results in the downshift from the third speed to the second speed before the vehicle speed (V) is not slowed down so much, so that sufficient acceleration performance can be obtained, thereby obtaining high driveability. In addition, since this is the downshift from the third speed to the second speed after it is confirmed that the working hydraulic pressure in the 5-speed hydraulic clutch 18 and the working hydraulic pressure in the 4-speed hydraulic clutch 19 have become zero, the 5-speed hydraulic clutch 18 and the 4-speed hydraulic clutch 19 are completely disengaged, so that heat generation and the like in a half-engaged state, for example, can be prevented. Further, since the downshift is performed when the predetermined waiting time t has been elapsed after the working hydraulic pressure in the 5-speed hydraulic clutch 18 and the working hydraulic pressure in the 4-speed hydraulic clutch 19 became zero, even if only little working hydraulic pressure remains in the 5-speed hydraulic clutch 18 and/or the 4-speed hydraulic clutch 19, the residue can be effectively removed during the predetermined waiting time t. Note that, if the working hydraulic pressure in the 5-speed hydraulic clutch 18 and the working hydraulic pressure in the 4-speed hydraulic clutch 19 can be monitored highly accurately, the downshift from the third speed to the second speed may be performed immediately after the working hydraulic pressure in the 5-speed hydraulic clutch 18 and the working hydraulic pressure in the 4-speed hydraulic clutch 19 have become zero. In this case, the downshift from the third speed to the second speed can be performed while the slowdown of the vehicle speed (V) is extremely small.

Figure 8:
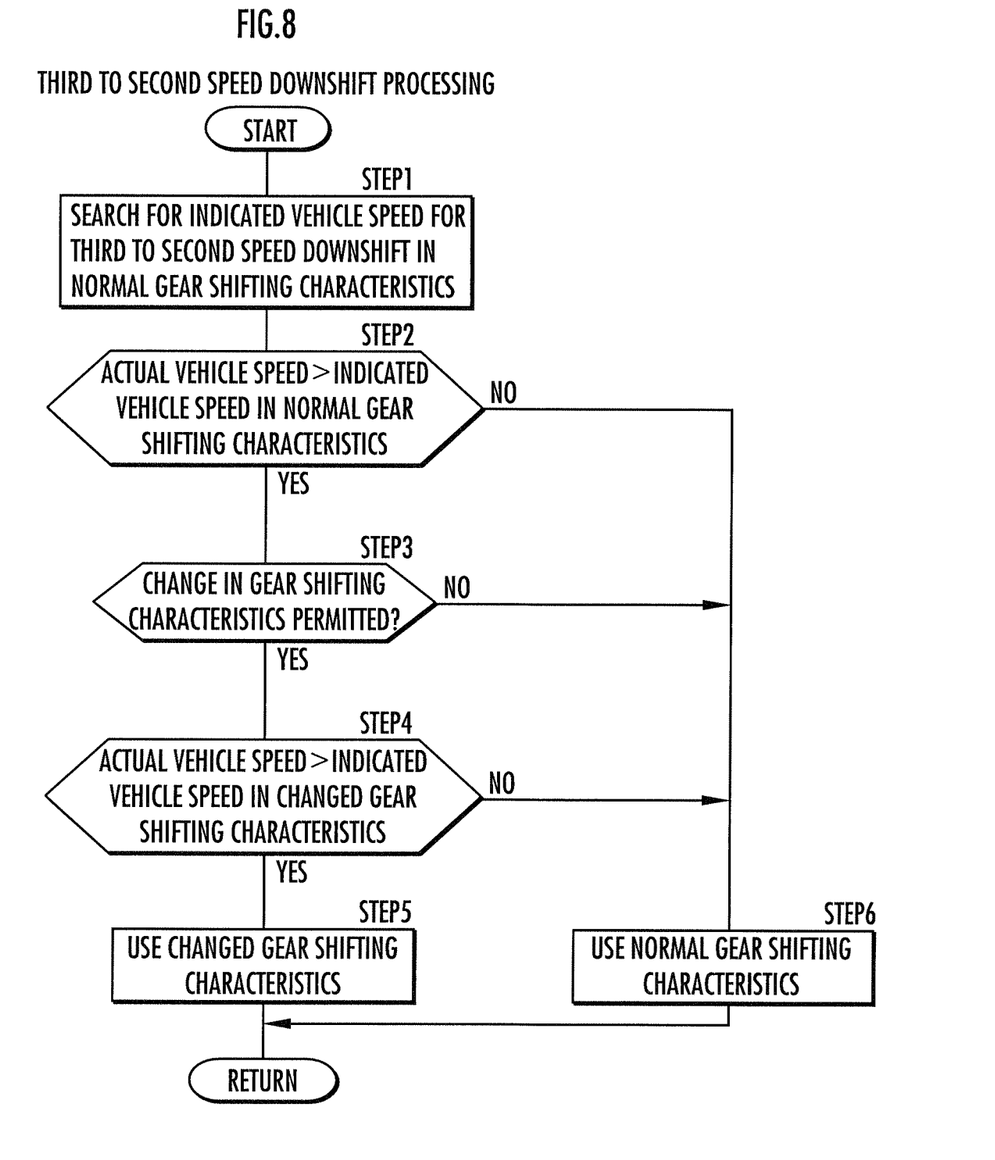
FIG. 8 is a flowchart showing an example of control related to a change in gear shifting characteristics.

In the embodiment, the following procedure is employed as processing for changing the gear shifting characteristics performed by the electronic control circuit 5. Namely, after shifting from the fifth speed to the fourth speed and further shifting from the fourth speed to the third speed, the procedure enters third to second speed downshift processing as shown in FIG. 8. Then, based on the normal gear shifting characteristics (see FIG. 5), an indicated vehicle speed for the third to second speed downshift is searched for (STEP1). At this time, if the actual vehicle speed (V) is higher than the indicated vehicle speed in the normal gear shifting characteristics (STEP2), if a change in gear shifting characteristics is permitted (STEP3), and if the actual vehicle speed (V) is lower than the indicated vehicle speed for the third to second speed downshift in the changed gear shifting characteristics (see FIG. 7) (STEP4), the shift from the third to the second speed is performed according to the changed gear shifting characteristics shown in FIG. 7 (STEP5). If any of the conditions in STEP3 to STEP5 is not satisfied, the shift from the third speed to the second speed is performed according to the normal gear shifting characteristics (STEP6).

In the embodiment, the 4-speed hydraulic pressure switch 46 and the 5-speed hydraulic pressure switch 47 are employed as monitoring means according to the present invention to monitor the working hydraulic pressures of the 4-speed hydraulic clutch 19 and the 5-speed hydraulic clutch 18 based on information from the 4-speed hydraulic pressure switch 46 and the 5-speed hydraulic pressure switch 47. Alternatively, monitoring may be performed in such a manner that data indicative of a relationship between the input shaft speed (Nm) and the working oil discharging time is prestored in the electronic control circuit 5 for each working oil temperature of each clutch to determine an estimate value indicative of a drop in working hydraulic pressure (or a drop in the remaining amount of working oil) from the working oil discharging time corresponding to an actual input shaft speed (Nm) and an actual working oil temperature of the clutch in order to monitor, based on this estimate value, that the working hydraulic pressure of the 4-speed hydraulic clutch 19 and the 5-speed hydraulic clutch 18 is zero. In addition, if monitor pressure is not zero but equal or less than a predetermined positive threshold (for example, 9.8 kPa), a gear shifting characteristic for shifting from a middle gear position to a low gear position among the gear shifting characteristics can be changed to a high vehicle speed side.

Further, in the embodiment, although the transmission 2 is provided with five gear positions (LOW speed, second speed, third speed, fourth speed, and fifth speed) in the forward range, the number of speeds is not limited thereto. For example, the present invention can also be applied to a transmission provided with four gear positions (LOW speed, second speed, third speed, and fourth speed) in the forward range.

What is claimed is:

1. A controller for a vehicle automatic transmission, which engages or disengages plural hydraulic engagement elements in a rotational state to switch plural gear positions, defined based on traveling conditions of the vehicle, automatically according to predetermined gear shifting maps, the controller comprising:

monitoring means for monitoring working hydraulic pressure of hydraulic engagement elements for a high gear range to effect a high gear position among the gear positions; and characteristic changing means for changing a gear shifting characteristic along a vehicle speed scale in an increasing direction, wherein the gear shifting characteristic is for shifting from a middle gear position to a low gear position along a gear shifting map, and wherein the changing of the gear shifting characteristic along the map occurs when the hydraulic engagement elements for the high gear range are disengaged along with a shift from the high gear position to the middle gear position, and when the working hydraulic pressure monitored by the monitoring means has become zero or less than a positive threshold.

2. The controller for a vehicle automatic transmission according to claim 1, wherein the monitoring means is a hydraulic pressure detector which detects the working hydraulic pressure of the hydraulic engagement elements for the high gear range.

3. The controller for a vehicle automatic transmission according to claim 1, wherein the monitoring means determines an estimate value of the working hydraulic pressure based on a rotational speed of an input shaft with respect to the hydraulic engagement elements for the high gear range and a working oil temperature of the hydraulic engagement elements for the high gear range to perform monitoring based on the estimate value.

4. A controller for a vehicle automatic transmission, which engages or disengages plural hydraulic engagement elements to switch plural gear positions, defined based on traveling conditions of the vehicle, automatically according to predetermined gear shifting maps, the controller comprising:

monitoring means for monitoring working hydraulic pressure of hydraulic engagement elements for a high gear range to effect a high gear position among the gear positions; and characteristic changing means for changing a gear shifting characteristic along a vehicle speed scale in an increasing direction, wherein the gear shifting characteristic is for shifting from a middle gear position to a low gear position along a gear shifting map, and wherein the changing of the gear shifting characteristic along the map occurs when the hydraulic engagement elements for the high gear range are disengaged along with a shift from the high gear position to the middle gear position, and when a predetermined period of time has elapsed after the working hydraulic pressure monitored by the monitoring means became zero or less than a positive threshold.

5. The controller for a vehicle automatic transmission according to claim 4, wherein the monitoring means is a hydraulic pressure detector which detects the working hydraulic pressure of the hydraulic engagement elements for the high gear range.

6. The controller for a vehicle automatic transmission according to claim 4, wherein the monitoring means determines an estimate value of the working hydraulic pressure based on a rotational speed of an input shaft with respect to the hydraulic engagement elements for the high gear range and a working oil temperature of the hydraulic engagement elements for the high gear range to perform monitoring based on the estimate value.

* * * * *